Feb. 21, 1928.
R. R. HEFFNER
ROASTER
Filed April 27, 1927
1,660,226
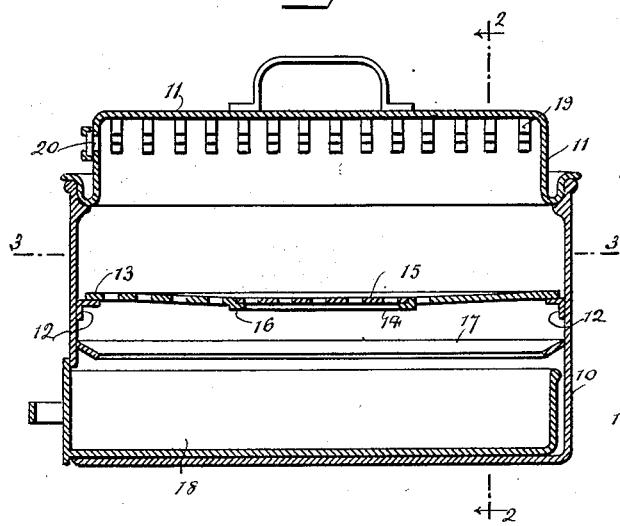
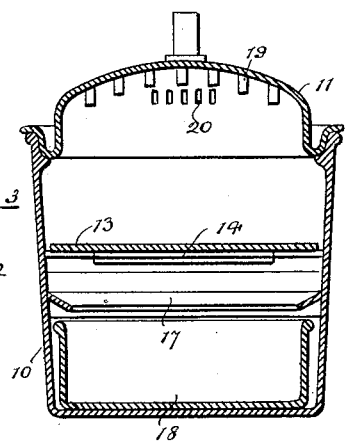
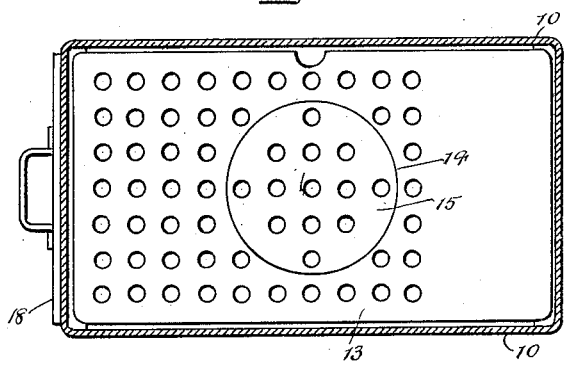
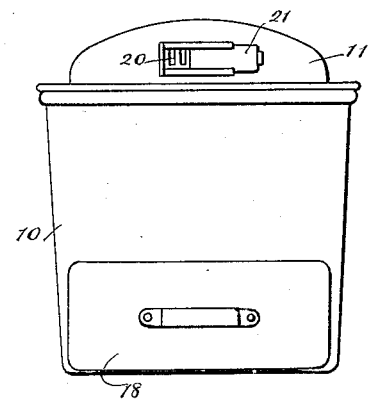
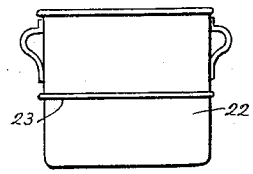
WITNESSES
H. J. Walker
INVENTOR
Ruth Rae Heffner
BY
ATTORNEY Patented Feb. 21, 1928.

1,660,226

UNITED STATES PATENT OFFICE.

RUTH REA HEFFNER, OF CLEARFIELD, PENNSYLVANIA.

ROASTER.

Application filed April 27, 1927. Serial No. 186,991.

My invention relates to a cooking utensil, primarily adapted for roasting and having provision for receiving a cooking pot in which boiled foods may be cooked.

The general object of my invention is to provide a novel roaster effective for roasting and also for boiling foods, of simple construction and arranged to be easily cleaned as well as readily accessible for observing the cooking as it progresses.

Reference is to be had to the accompanying drawings forming a part of this specification, it being understood that the drawings are merely illustrative of one example of the invention.

Figure 1 is a longitudinal vertical section of a roaster embodying my invention.

Figure 2 is a transverse vertical section on the line 2—2 of Figure 1.

Figure 3 is a horizontal section on the line 3—3 of Figure 1.

Figure 4 is an end view of my improved roaster.

Figure 5 is an end view of a pot for boiling foods and fitted to be supported by a characteristic element of the roaster.

In the illustrated example of my invention, a body 10 is provided with a closed bottom and an open top, the said open top receiving a cover 11. At the interior of the body 10 ledges 12 are provided at opposite ends or opposite sides, and these support a perforated partition 13 which tapers downwardly toward a central opening 14 which is adapted to receive a perforated plate 15 resting on ledges or flanges 16 of plate 13 at the central opening. Below the perforated plate 13 and extending at four sides of the body 10 are deflector flanges 17 flaring upwardly so as to cause the drip from the roasting food to be directed toward the center of the body 10. A drip drawer 18 is provided, slidable into or out of the body 10, at the bottom.

The cover 11 has depending pins or equivalent drip elements 19 on the under side thereof, on which moisture will collect and then drip to the food supported in the pan on the perforated plate 13. The cover 11 is provided with vent openings 20 adapted to be exposed to a greater or less extent by a slide 21 (Figure 4).

With the above described construction, a pan containing the food to be roasted is placed on the perforated partition 13. Any drip passing downwardly through the plate 13 is deflected by the drip flanges 17 and directed to the drawer 18. When it is desired to use the utensil for boiling the plate 15 is removed and the pot or boiler 22, shown in Figure 5, is placed in the opening 14, said pot resting by its flange 23 on the plate 13 at said opening 14.

I would state furthermore that while the illustrative example constitutes a practical embodiment of my invention, I do not limit myself strictly to the exact details herein illustrated, since, manifestly, the same can be considerably varied without departure from the spirit of the invention as defined in the appended claim.

I claim:

A cooking utensil including a hollow body, a perforated plate removably supported within the body below the top thereof, said plate sloping on all sides toward the central area of the plate and a removable central portion on said plate, said plate having an opening at said removable portion adapted to support a boiling vessel.

RUTH REA HAFFNER.